No. 760,827. PATENTED MAY 24, 1904.
T. VICARS & J. VICARS, THE YOUNGER.
BISCUIT STAMPING AND CUTTING MACHINE.
APPLICATION FILED FEB. 21, 1903.
NO MODEL. 4 SHEETS—SHEET 2.
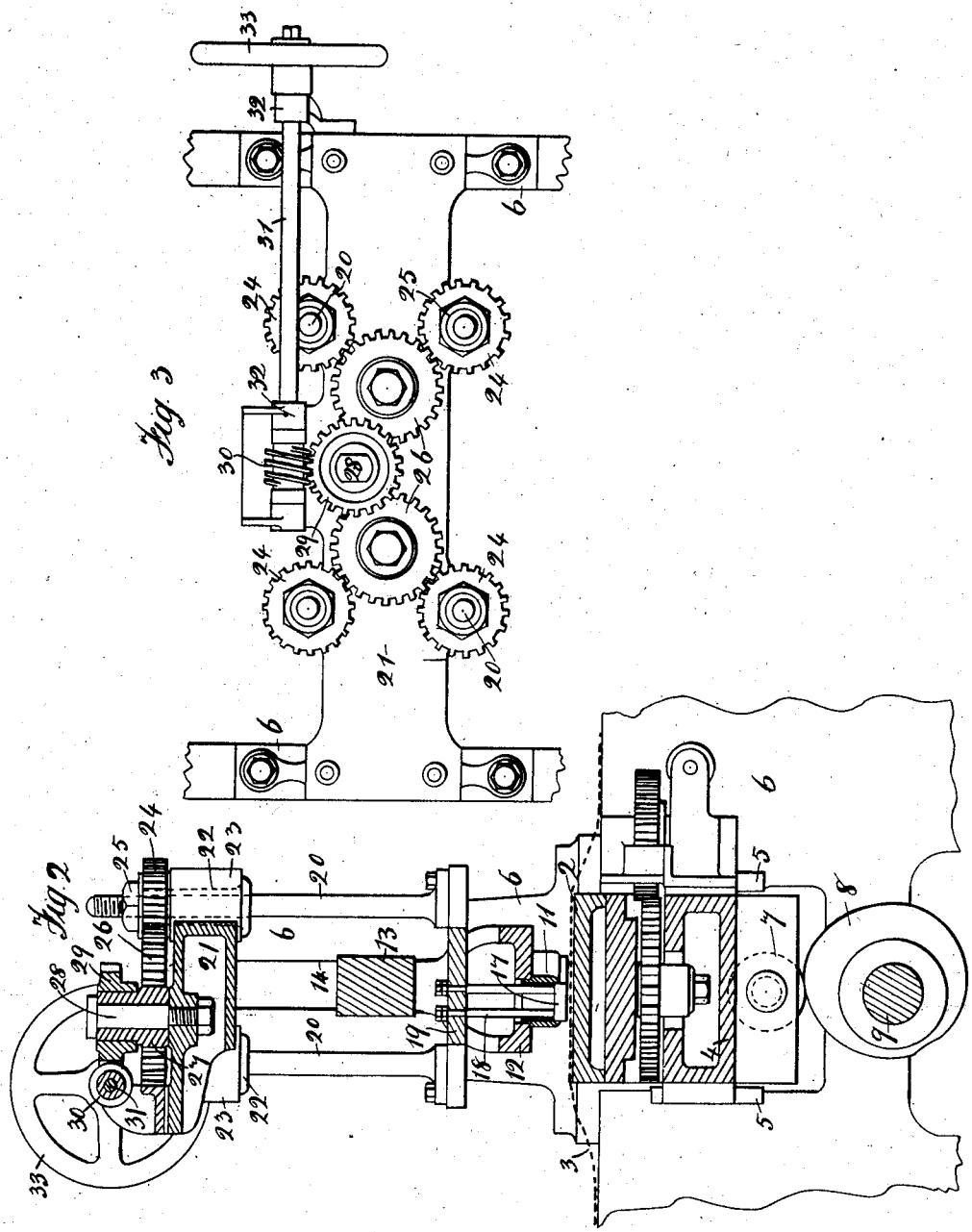
Witnesses
W. B. Johnson
F. Bennett
Inventors
Thomas Vicars
John Vicars the Younger No. 760,827. PATENTED MAY 24, 1904.
T. VICARS & J. VICARS, THE YOUNGER.
BISCUIT STAMPING AND CUTTING MACHINE.
APPLICATION FILED FEB. 21, 1903.
NO MODEL. 4 SHEETS—SHEET 3.

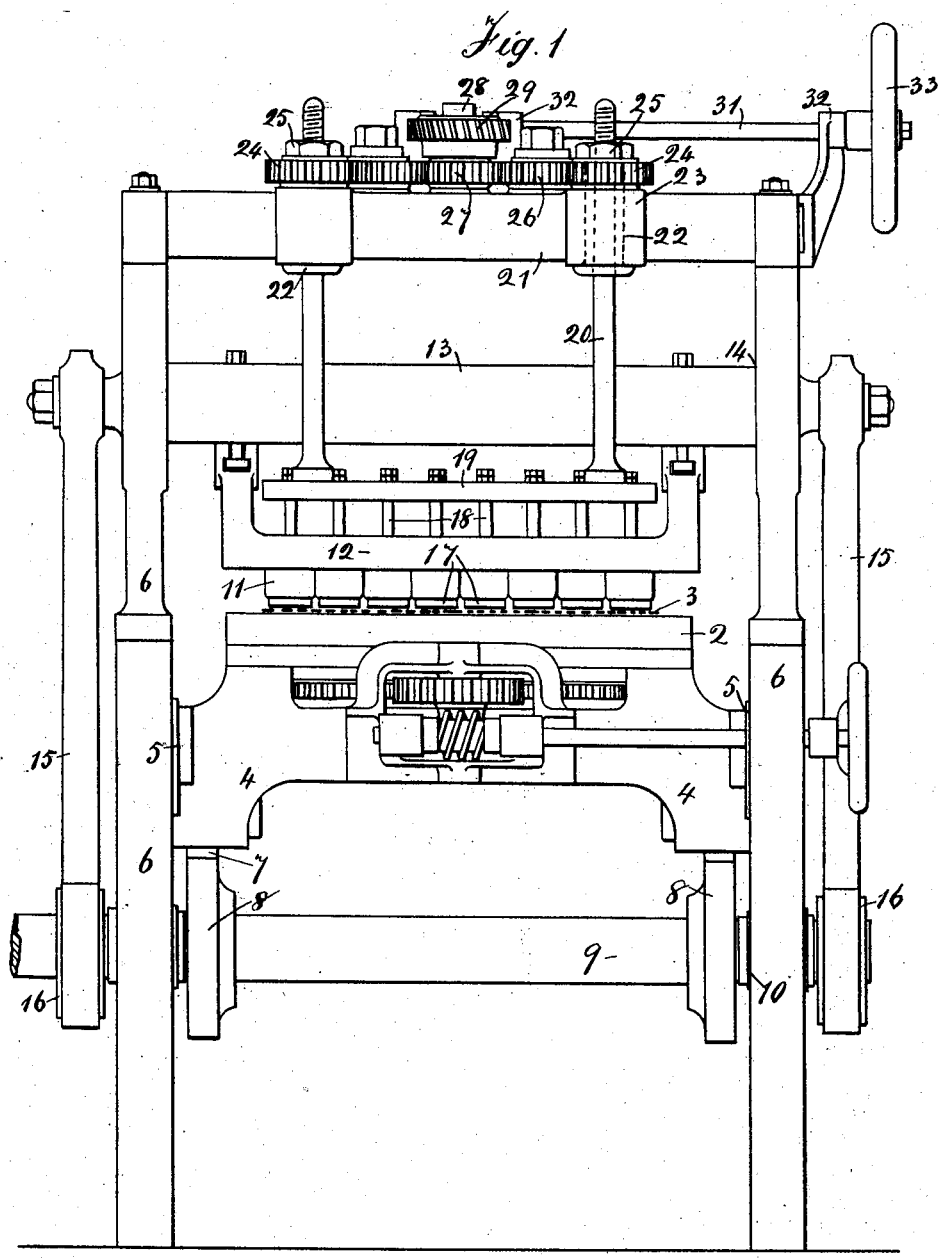

Witnesses
M. B. Johnson
F. Bennett

Inventors
Thomas Vicars
John Vicars the Younger

No. 760,827. PATENTED MAY 24, 1904.
T. VICARS & J. VICARS, THE YOUNGER.
BISCUIT STAMPING AND CUTTING MACHINE.
APPLICATION FILED FEB. 21, 1903.
NO MODEL. 4 SHEETS—SHEET 4.

Witnesses
W. B. Johnson
F. Bennett

Inventors
Thomas Vicars
John Vicars the Younger

No. 760,827. Patented May 24, 1904.

UNITED STATES PATENT OFFICE.

THOMAS VICARS AND JOHN VICARS, THE YOUNGER, OF EARLESTOWN, ENGLAND.

BISCUIT STAMPING AND CUTTING MACHINE.

SPECIFICATION forming part of Letters Patent No. 760,827, dated May 24, 1904.

Application filed February 21, 1903. Serial No. 144,513. (No model.)

*To all whom it may concern:*

Be it known that we, THOMAS VICARS and JOHN VICARS, the Younger, subjects of the King of Great Britain, residing at Earlestown, in the county of Lancaster, England, have invented new and useful Improvements in Biscuit Stamping and Cutting Machines, of which the following is a specification.

The invention relates to machines in which hollow cutters surrounding the stamps, embossers, or impressors act first to detach or strip off the stamped sheet of dough from the stamps and then complete the cutting out of the biscuits from the sheet; and our invention consists in new constructions, arrangements, and operations of mechanism to effect these purposes and to regulate the mechanism according to the thickness of the sheet of dough from which the biscuits are being cut.

The accompanying drawings illustrate several arrangements of mechanism according to our invention.

Figure 4:
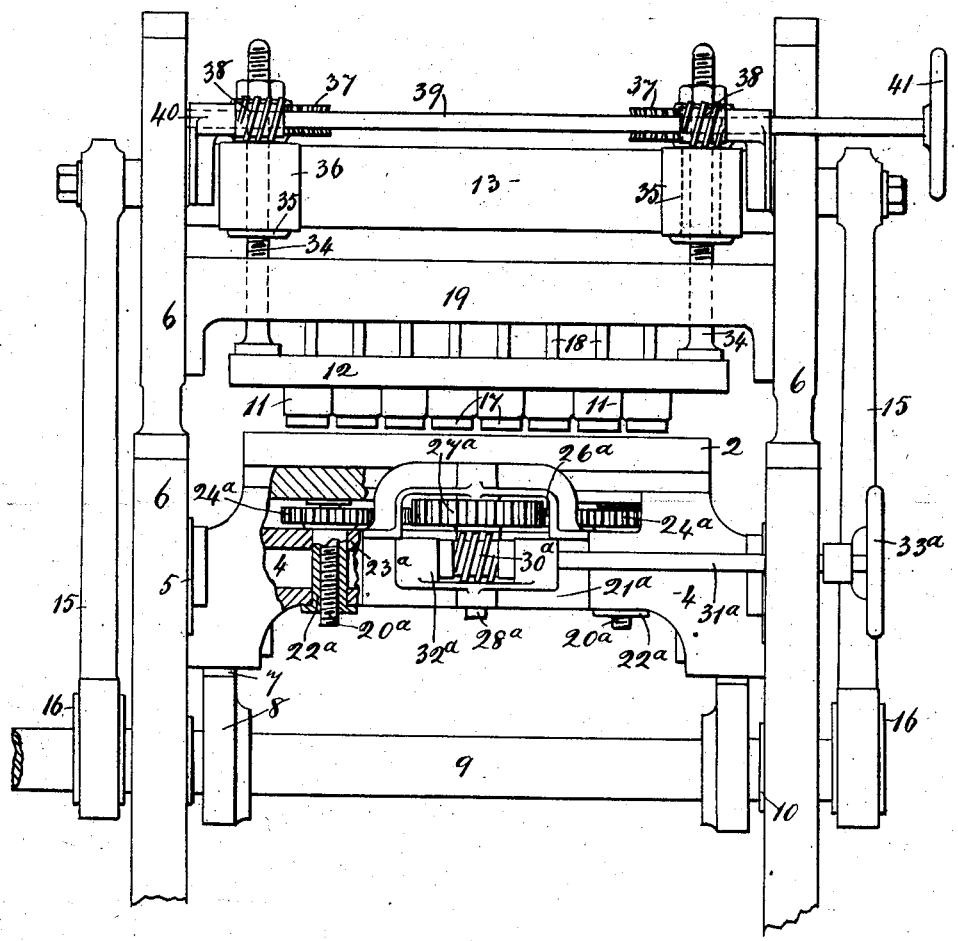
Figure 5:
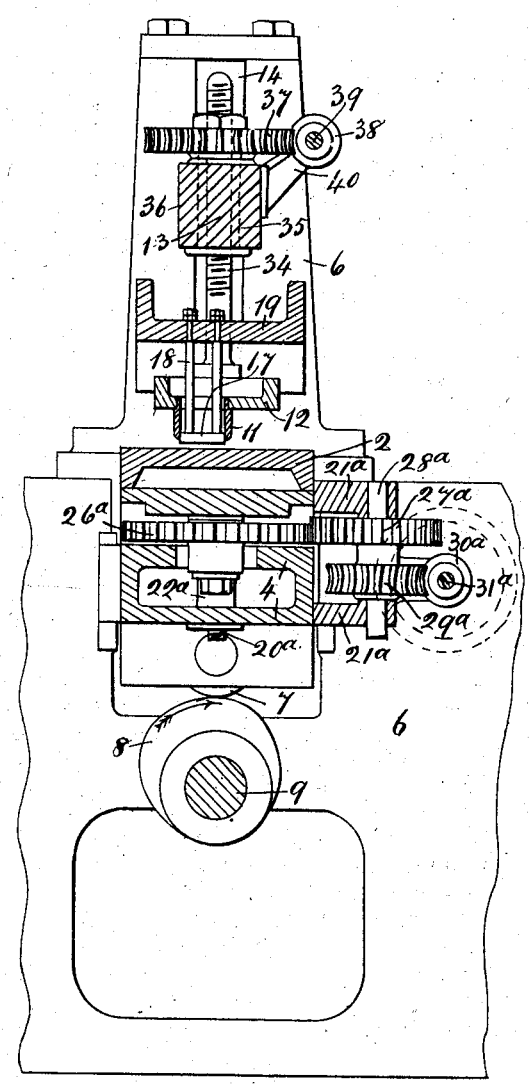

Figure 1 is an end view of one arrangement of parts in which stationary adjustable stamps are used. Fig. 2 is a central longitudinal section of the same, and Fig. 3 is a plan of the same. Fig. 4 is an end view, and Fig. 5 is a central longitudinal section, of a modification in which fixed inadjustable stamps are used.

The drawings only show the cutting and stamping parts of the machine, the remaining parts—for traversing the sheet of dough, removing the biscuits, and other operations connected with the manufacture—not being shown, as they are of any usual kind.

Like numerals indicate similar parts in all the views.

In carrying out our invention, as regards the stamping and cutting we arrange the cutting-table to reciprocate in guides or otherwise toward the cutters and stamps, while the stamps may be adjustably or rigidly fixed to the framework of the machine and the cutters caused to reciprocate either adjustably or not, or the table may be adjustable, or the cutters may be fixed to the framework and the stamps be caused to reciprocate.

Referring to Figs. 1, 2, and 3 of the drawings, 2 is the cutting-table, over which the sheet of dough 3 is caused to travel intermittently in the usual way. 4 represents brackets or a bearer supporting the table. 5 represents guides in or on the main framework 6, in which the brackets 4 can move up or down. The brackets are provided with rollers 7, which roll upon cams 8, secured to the rotatable shaft 9, which is carried in bearings 10 in the frame 6. 11 represents the cutters fixed to a bar 12, which is secured to a cross-head 13, which is movable up and down in slides 14 in the frame 6 in the usual way by rods 15, connected thereto and to the eccentrics 16, secured to the shaft 9, which latter is rotated by any suitable gearing. 17 represents the stamps or impressors for stamping the design on the biscuits, secured by rods 18 to a plate 19, which is in turn connected by rods 20 to a cross-head 21, attached to the frame 6. The rods 20 are screwed at their upper ends and engage with internally-screwed sleeves 22, which are rotatable in bosses or bearings 23 on the cross-head 21. 24 represents toothed wheels secured to the sleeves 22 by nuts 25 or otherwise, as convenient. The wheels 24 gear into idle wheels 26, which in turn gear with a toothed pinion 27, mounted on a pin 28 on the cross-head. 29 is a worm-wheel secured to the pinion 27 and operated by a worm 30 on a shaft 31, rotatable in bearings 32 by a hand-wheel 33. Thus by rotating the hand-wheel 33 the sleeves 22 are rotated and the rods 20, plate 19, rods 18, and stamps 17 are moved up or down, so that the stamps are adjusted to any desired distance from the table 2. Stripping-plates for stripping the dough from the outside of the cutters may be used; but these may be of any usual kind and for clearness are not shown. The action of the parts is as follows: The cams 8 raise up the table 2 and press the sheet of dough against the stamps 17, thus impressing the design on the biscuits. The table then begins to descend. In the meantime the eccentrics 16 are drawing down the cutters 11 from their highest position, and as the edges of the cutters pass the level of the stamp-faces they detach or strip off the stamped part of the sheet of dough from the stamps if it should adhere thereto, the dough falling onto the table, which, owing to form of cams 8, has been brought to rest a short distance below the stamps and remains there until the cutters by continued downward movement cut out the biscuits from the sheet. The cutters then rise, and if the biscuits adhere to the cutters they are stripped off by the stamps. The table then descends to its lowest position, the sheet of dough is advanced, the table again rises, and the operation is repeated.

It is to be observed that in all the arrangements herein described the action on the dough is the same or similar to that above described, and the cams or other operating devices must be so shaped and arranged as to effect the operations in the sequence stated.

Referring to Figs. 4 and 5, in this arrangement the plate 19, which carries the stamps 17, is rigidly fixed to the framework 6, so that the stamps have no motion whatever. The cutter-bar 12 has connected thereto rods 34, screwed at their upper ends, which engage in screwed sleeves 35, rotatable in bearings 36 in the cross-head 13. To the sleeves are secured worm-wheels 37, which are operated by worms 38, secured on a shaft 39, rotatable in bearings 40 on the cross-head 13. 41 is a hand-wheel for rotating the shaft 39. The cutting-table 2 is supported on screwed rods $20^a$, which engage with screwed sleeves $22^a$, rotatable in bearings $23^a$ in the brackets or bearer or support 4. $24^a$ represents toothed wheels formed with or secured to the sleeves $22^a$ and gearing with a central wheel $26^a$, which in turn gears with a pinion $27^a$, rotatable on a pin $28^a$ on a bracket $21^a$, fixed to the bracket 4. $29^a$ is a worm-wheel secured to the pinion $27^a$ and operated by a worm $30^a$, secured on a shaft $31^a$, rotatable in bearings $32^a$ on the bracket $21^a$ by the hand-wheel $33^a$. Thus by rotating the hand-wheel $33^a$ the sleeves $22^a$ are rotated and the table 2 raised or lowered with regard to the bracket 4, so that the distance of the surface of the table from the stamps can be regulated according to the thickness of the sheet of dough, and by rotating the hand-wheel 41 the sleeves 35 are rotated and the cutters are raised or lowered to correspond with the raising or lowering of the table. The shafts $31^a$ 39 may be geared together by any convenient gearing which will insure simultaneous rotation of both shafts, but which will allow of independent vertical movement of each shaft, so that both the cutters and cutting-table can be regulated by one hand-wheel.

Our invention is not confined to the exact details of construction above described, as it will be obvious that many different equivalent arrangements of mechanism may be made to effect the desired motions of the cutting-table and cutters and that other equivalent arrangements of regulating mechanism may be used at any convenient point in the connections between the operating-shaft and the cutters or stamps or table without departing from the nature of our invention.

We do not claim, broadly, the method of first stamping and afterward cutting out biscuits; but What we do claim, and desire to secure by Letters Patent, is—

1. In biscuit stamping and cutting machines the combination of a reciprocating cutting-table, reciprocating cutters, stationary stamps disposed within the cutters and gear for operating the table and cutters, substantially as described.

2. In biscuit stamping and cutting machines the combination of a reciprocating cutting-table, reciprocating cutters, stationary stamps disposed within the cutters, gear for operating the table and cutters, and mechanism for regulating the position of the stamps with relation to the cutting-table, substantially as described.

3. In biscuit stamping and cutting machines the combination of a reciprocating bearer, a cutting-table supported on the bearer, stationary stamps disposed within the cutters, reciprocating cutters, gear for operating the bearer and table, and cutters, regulating mechanism between the operating-gear and the table, and regulating mechanism on the connections between the operating-shaft and the cutters, substantially as described.

In testimony whereof we have signed our names to this specification in the presence of two subscribing witnesses.

THOMAS VICARS.
JOHN VICARS, THE YOUNGER.

Witnesses:
W. B. JOHNSON,
F. BENNETT.